US009233303B2

(12) United States Patent
Nordenstam et al.

(10) Patent No.: US 9,233,303 B2
(45) Date of Patent: Jan. 12, 2016

(54) MOBILE DEVICE GAME INTERFACE (71) Applicant: KING.COM LIMITED, St. Julians (MT)

(72) Inventors: Olov Nordenstam, Malmo (SE); Robin Brook, Malmo (SE); Dennis Gustafsson, Malmo (SE)

(73) Assignee: King.com Ltd., St. Julians (MT)

( * ) Notice: Subject to any disclaimer, the term of this patent is extended or adjusted under 35 U.S.C. 154(b) by 0 days.

(21) Appl. No.: 14/278,686

(22) Filed: May 15, 2014

(65) Prior Publication Data

US 2014/0342822 A1    Nov. 20, 2014

(30) Foreign Application Priority Data

May 15, 2013    (GB) .................................. 1308784.6

(51) Int. Cl.
*A63F 13/10*    (2006.01)
*A63F 13/40*    (2014.01)
*A63F 13/00*    (2014.01)

(52) U.S. Cl.
CPC ................. *A63F 13/10* (2013.01); *A63F 13/00* (2013.01); *A63F 2300/65* (2013.01)

(58) Field of Classification Search
USPC ..................................................... 463/30, 32
See application file for complete search history.

(56) References Cited

U.S. PATENT DOCUMENTS

| 8,128,476 | B1 | 3/2012 | Sidhu et al. | |
| 8,800,026 | B2 * | 8/2014 | Tamaki | ............................ 726/16 |
| 2004/0002380 | A1 | 1/2004 | Brosnan et al. | |
| 2014/0235338 | A1 * | 8/2014 | Hansson et al. | ................ 463/31 |
| 2014/0370950 | A1 * | 12/2014 | Hansson et al. | .................. 463/9 |
| 2015/0141148 | A1 * | 5/2015 | Hansson et al. | ................ 463/36 |

FOREIGN PATENT DOCUMENTS

WO        97/35258        9/1997

OTHER PUBLICATIONS

International Search Report, dated Aug. 6, 2014, issued in corresponding International Application No. PCT/EP2014/060023.

* cited by examiner

*Primary Examiner* — Pierre E Elisca
(74) *Attorney, Agent, or Firm* — Saul Ewing LLP (57) ABSTRACT

There is provided a computer implemented method of controlling a user interface and displaying a game board arrangement, the method comprising the following implemented by at least one processor in communication with said interface and at least one memory: displaying a subset of a set of game objects, each game object having one or more characteristics, information on said subset of game objects and said game objects being stored in said at least one memory, determining a position and trajectory of movement in dependence on user input via said user interface, executing an algorithm for determining if a particular game object is to be selected or if a different subset of game objects is to be displayed in dependence on the position and trajectory of movement and the stored information on said subset of game objects, updating said subset of game objects and information such that the particular game object is selected or a different subset of game objects is displayed; and displaying said updated subset of objects.

22 Claims, 10 Drawing Sheets

MOBILE DEVICE GAME INTERFACE

CROSS-REFERENCE TO RELATED APPLICATIONS

This application is based on, and claims priority to, GB Application No. 1308784.6, filed May 15, 2013, the entire contents of which is fully incorporated herein by reference.

FIELD OF THE INVENTION

Some embodiments may relate to controlling a user interface responsive to user engagement with displayed objects on the interface of a computer device.

Some embodiments may relate in particular, but not exclusively to computer devices having a user interface for engaging users or players in a computer game executable in an online or offline environment.

BACKGROUND OF THE INVENTION

There are many technical challenges and technical considerations facing the designer of computer games executed on user or computer devices having a user interface, such as designing a controllable user interface in the context of available computer devices and resources, which may be limited.

Another technical challenge can involve enabling a game to be fun, accessible and compelling even when there is limited display resource available, such as when a game is being played on a smartphone, tablet or other small or portable computer.

Another significant challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

Effective engagement may also require various forms of feedback based on the game mechanics and successful utilisation by the user to reinforce the user or player sense of success and accomplishment.

Providing effective feedback in real time during game play, without hindering or disengaging the player is not trivial, especially when limited display resource may be available on the user device.

There are therefore many technical challenges when designing computer implemented games, particularly in providing a challenge to a user or player that is engaging with feedback that ultimately rewards the user so as to provoke repeat play without disengaging or frustrating the user. This may, but not exclusively apply to "casual games".

SUMMARY OF THE INVENTION

In a first aspect there is provided a computer implemented method of controlling a user interface and displaying a game board arrangement, the method comprising the following implemented by at least one processor in communication with said interface and at least one memory: displaying a subset of a set of game objects, each game object having one or more characteristics, information on said subset of game objects and said game objects being stored in said at least one memory, determining a position and trajectory of movement in dependence on user input via said user interface, executing an algorithm for determining if a particular game object is to be selected or if a different subset of game objects is to be displayed in dependence on the position and trajectory of movement and the stored information on said subset of game objects, updating said subset of game objects and information such that the particular game object is selected or a different subset of game objects is displayed and displaying said updated subset of objects.

The method may comprise determining an initial user input position and a final user input position.

The method may comprise determining a game object at the initial user input initiation position.

The method may comprise storing the determined object in at least one memory until detection of the final user input position.

The particular object to be selected may be the determined object.

The method may comprise displaying a first gameboard arrangement in a first display area.

The method may comprise causing a particular object to be selected if the final user input position is in the first display area.

The method may comprise causing a particular object to be selected if the distance between the initial user input position and the final user input position exceeds a threshold.

The method may comprise determining a trajectory of movement having a first component in a first direction and a second component in a second direction, wherein the first direction is orthogonal to the second direction.

The method may comprise causing a particular object to be selected if the first component is larger than the second component.

The method may comprise causing a particular object to be selected if the trajectory extends a distance in the first direction which exceeds a threshold.

The method may comprise causing a different subset to be displayed if the second component is larger than the first component.

The method may comprise causing a plurality of different subsets to be displayed until a final user input position is detected.

The method may comprise determining acceleration in dependence of a user input and causing the plurality of different subsets to be displayed with a speed dependent on the acceleration.

The method may comprise determining frequency of a plurality of user inputs and causing a plurality of different subsets to be displayed with a speed dependent on the frequency.

The method may comprise causing the subset of objects to be displayed in an annular or linear arrangement.

The method may comprise causing at least one object to be displayed with a first display characteristic.

The method may comprise causing a different object to be displayed with the first display characteristic if a different subset is to be displayed.

The method may comprise controlling the size of a game object dependent on the position of the game object.

The game object to be selected may provide a function in a game.

In a second aspect there is provided a device having a user interface configured to display a game board having a plurality of game objects, at least one memory storing each game object having one or more characteristics, said user interface being configured to receive user input, and at least one processor in connection or communication with at least one memory configured to: display a subset of a set of game objects, each game object having one or more characteristics, information on said subset of game objects and said game objects being stored in said at least one memory, determine a position and trajectory of movement in dependence on user input via said user interface, execute an algorithm for determining if a particular game object is to be selected or if a different subset of game objects is to be displayed in dependence on the position and trajectory of movement and the stored information on said subset of game objects, update said subset of game objects and information such that the particular game object is selected or a different subset of game objects is displayed and display said updated subset of objects.

The at least one processor in connection or communication with at least one memory may be configured to determine an initial user input position and a final user input position.

The at least one processor in connection or communication with at least one memory configured to determine a game object at the initial user input initiation position.

The at least one processor in connection or communication with at least one memory may be configured to store the determined object in at least one memory until detection of the final user input position.

The particular object to be selected may be the determined object.

The at least one processor in connection or communication with at least one memory may be configured to display a first gameboard arrangement in a first display area.

The at least one processor in connection or communication with at least one memory may be configured to cause a particular object to be selected if the final user input position is in the first display area.

The at least one processor in connection or communication with at least one memory configured to cause a particular object to be selected if the distance between the initial user input position and the final user position exceeds a threshold.

The at least one processor in connection or communication with at least one memory may be configured to determine a trajectory of movement having a first component in a first direction and a second component in a second direction, wherein the first direction is orthogonal to the second direction.

The at least one processor in connection or communication with at least one memory may be configured to cause a particular object to be selected if the first component is larger than the second component.

The at least one processor in connection or communication with at least one memory may be configured to cause a particular object to be selected if the trajectory extends a distance in the first direction which exceeds a threshold.

The at least one processor in connection or communication with at least one memory may be configured to cause a different subset to be displayed if the second component is larger than the first component.

The at least one processor in connection or communication with at least one memory may be configured to cause a plurality of different subsets to be displayed until a final user input position is detected.

The at least one processor in connection or communication with at least one memory may be configured to determine acceleration in dependence of a user input and causing the plurality of different subsets to be displayed with a speed dependent on the acceleration.

The at least one processor in connection or communication with at least one memory may be configured to determine frequency of a plurality of user inputs and causing a plurality of different subsets to be displayed with a speed dependent on the frequency.

The at least one processor in connection or communication with at least one memory may be configured to cause the subset of objects to be displayed in an annular or linear arrangement.

The at least one processor in connection or communication with at least one memory may be configured to cause at least one object to be displayed with a first display characteristic.

The at least one processor in connection or communication with at least one memory configured to cause a different object to be displayed with the first display characteristic if a different subset is to be displayed.

The at least one processor in connection or communication with at least one memory may be configured to control the size of a game object dependent on the position of the game object.

The game object to be selected may provide a function in a game.

In a third aspect there is provided a computer readable storage device storing program code instructions that, when executed by at least one processor in communication with a user interface and at least one memory, causes the at least one processor to: display a subset of a set of game objects, each game object having one or more characteristics, information on said subset of game objects and said game objects being stored in said at least one memory, determine a position and trajectory of movement in dependence on user input via said user interface, execute an algorithm for determining if a particular game object is to be selected or if a different subset of game objects is to be displayed in dependence on the position and trajectory of movement and the stored information on said subset of game objects, update said subset of game objects and information such that the particular game object is selected or a different subset of game objects is displayed and display said updated subset of objects.

The at least one processor may be caused to determine an initial user input position and a final user input position.

The at least one processor may be caused to determine a game object at the initial user input initiation position.

The at least one processor may be caused to store the determined object in at least one memory until detection of the final user input position.

The particular object to be selected may be the determined object.

The at least one processor may be caused to display a first gameboard arrangement in a first display area.

The at least one processor may be caused to cause a particular object to be selected if the final user input position is in the first display area.

The at least one processor may be caused to cause a particular object to be selected if the distance between the initial user input position and the final user position exceeds a threshold.

The at least one processor in connection or communication with at least one memory may be configured t may be caused to o determine a trajectory of movement having a first component in a first direction and a second component in a second direction, wherein the first direction is orthogonal to the second direction.

The at least one processor may be caused to cause a particular object to be selected if the first component is larger than the second component.

The at least one processor may be caused to cause a particular object to be selected if the trajectory extends a distance in the first direction which exceeds a threshold.

The at least one processor may be caused to cause a different subset to be displayed if the second component is larger than the first component.

The at least one processor in connection or communication with at least one memory may be configured to cause a plurality of different subsets to be displayed until a final user input position is detected.

The at least one processor may be caused to determine acceleration in dependence of a user input and causing the plurality of different subsets to be displayed with a speed dependent on the acceleration.

The at least one processor may be caused to determine frequency of a plurality of user inputs and causing a plurality of different subsets to be displayed with a speed dependent on the frequency.

The at least one may be caused to cause the subset of objects to be displayed in an annular or linear arrangement.

The at least one processor may be caused to cause at least one object to be displayed with a first display characteristic.

The at least one processor may be caused to cause a different object to be displayed with the first display characteristic if a different subset is to be displayed.

The at least one processor in connection or communication with at least one memory may be configured to control the size of a game object dependent on the position of the game object.

The game object to be selected may provide a function in a game.

Other aspects and features are described with reference to the appended claims.

BRIEF DESCRIPTION OF DRAWINGS

To understand some embodiments, reference will now be made by way of example only to the accompanying drawings, in which.

DETAILED DESCRIPTION OF THE INVENTION

Figure 1:
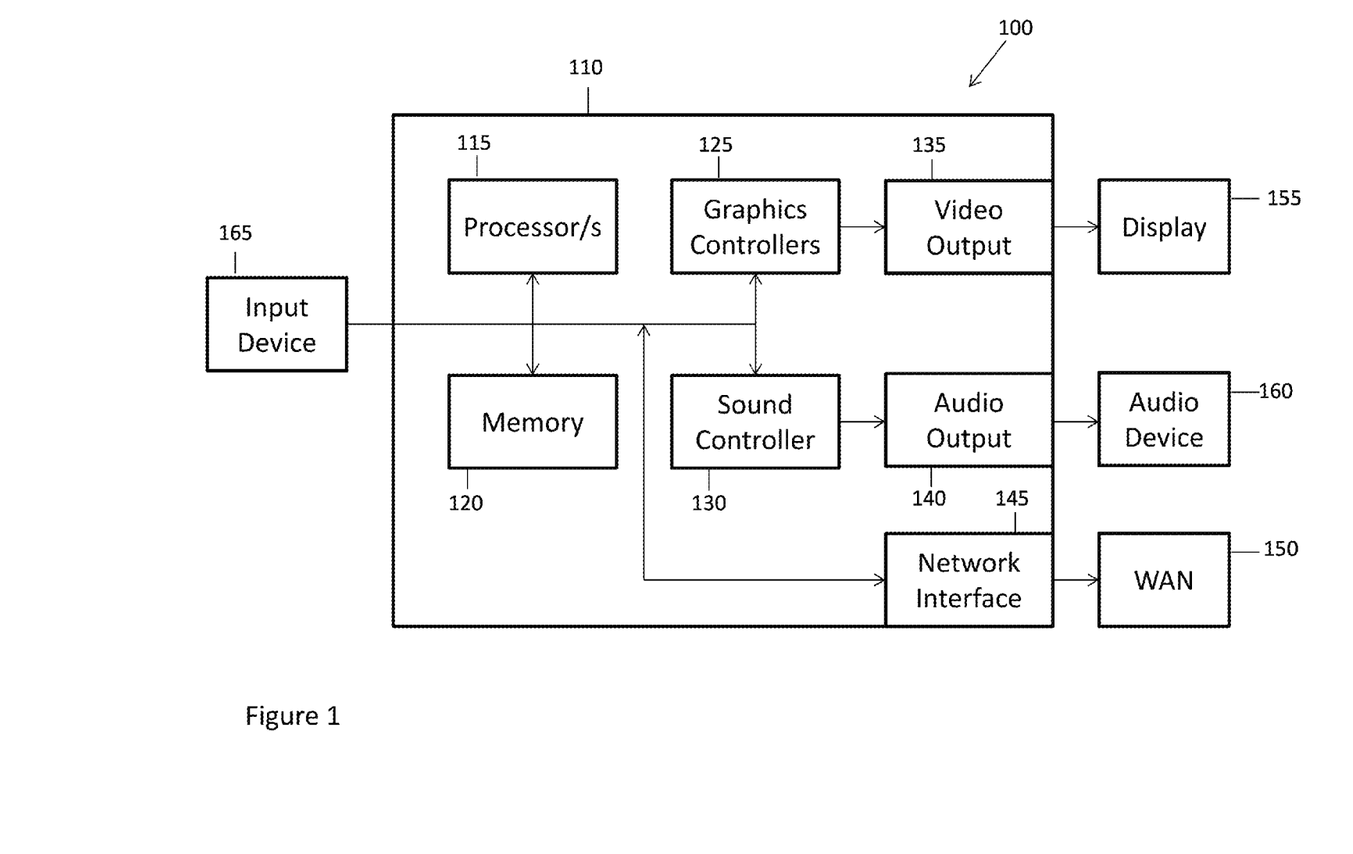
FIG. 1 shows an example client or user device of an embodiment.

A schematic view of a client or user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
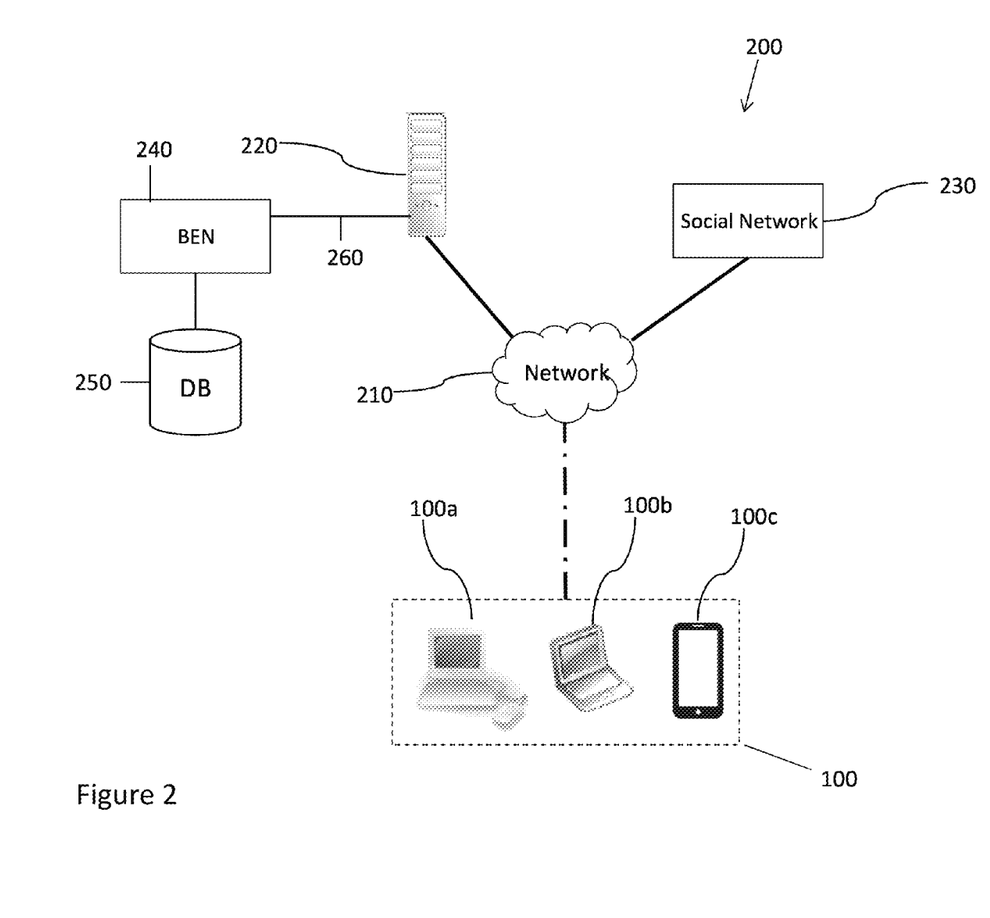
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor 115 to run the games program and process the user behaviour data.

The server 220 may communicate via for instance the internet 210 to one or more client or user devices 100, shown in the figure by way of example as user devices 100a, 100b and 100c, and may further provide connections to a social network 230 such as Facebook™'.

As screen size is reduced it may be desirable to maximise the display area for a particular part of the display. For example, where the application is a computer implemented game, it may be desirable to maximise the display area of the game board. As a result, there may only be a small proportion of the display area remaining to display other objects. If there is a large number of objects to display in a small display area, it may be desirable to provide an improved method of displaying these objects so that a user can review and select the objects.

Figure 3:
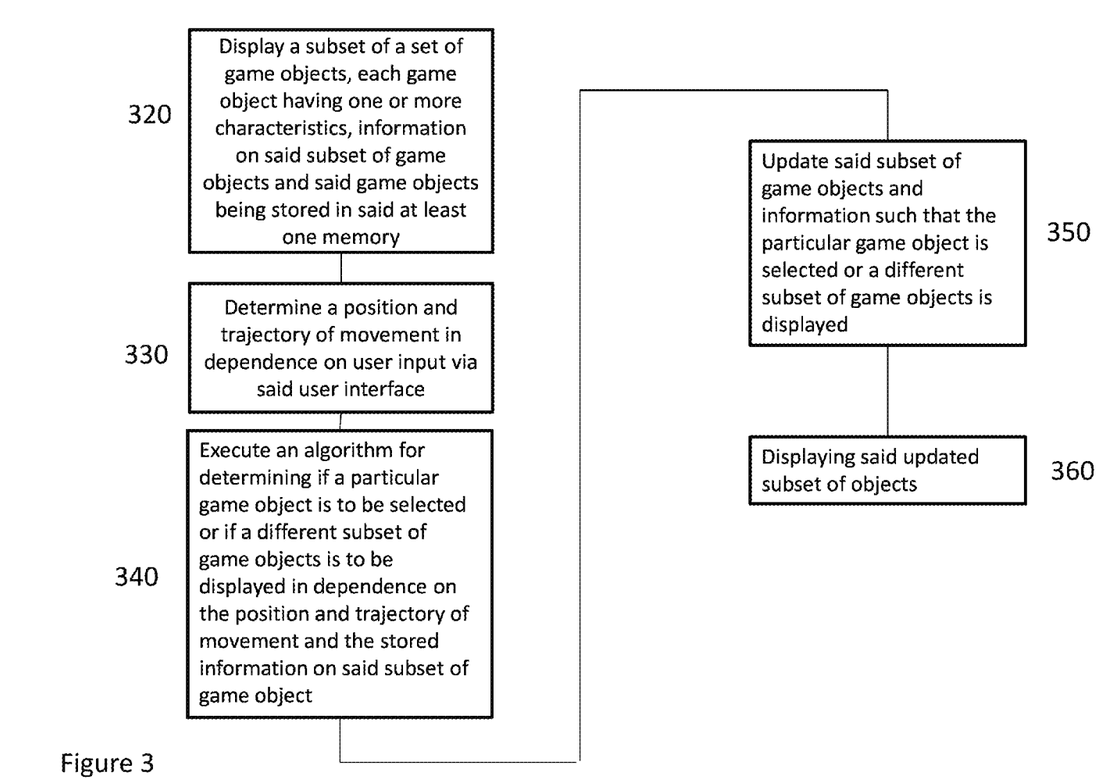
FIG. 3 is a flowchart illustrating steps of a method according to an embodiment.

FIG. 3 shows a method of interacting with a user interface responsive to user input, the user interface having a display area. The user interface may be a touchscreen. In particular the method of FIG. 3 may be used to allow a user to select an object from a group of objects via the user interface. FIG. 3 illustrates a flow diagram 300 of an algorithm in which prior to the first step, a processor 115 may retrieve from memory 120 or server 220 via network 210 information defining a display area and associated objects to display in the display area. The information may be provided by an application. The application may be a computer implemented game which has a display area and associated game objects to display.

In some embodiments wherein the application is a touch or mouse controlled game, user interface elements such as pointers may or may not be displayed as appropriate for the haptic interface hardware and resources available.

Regardless of application or game type, the method then proceeds to step 320 wherein a subset of a set of objects is displayed, on a display area of a user interface responsive to user input. The object positions may be arranged for example, in a linear or an annular configuration.

In step 330, position and trajectory of movement in dependence on user input via said user interface is determined.

In step 340, an algorithm may then be executed to determine if a particular game object is to be selected or a different subset of game objects is to be displayed in dependence on the position and trajectory of movement and the stored information on the subset of game objects and game objects. The subset of game objects and information may then be updated in step 350 such that the particular game object is selected or a different subset of game objects is displayed in step 360.

Figure 4:
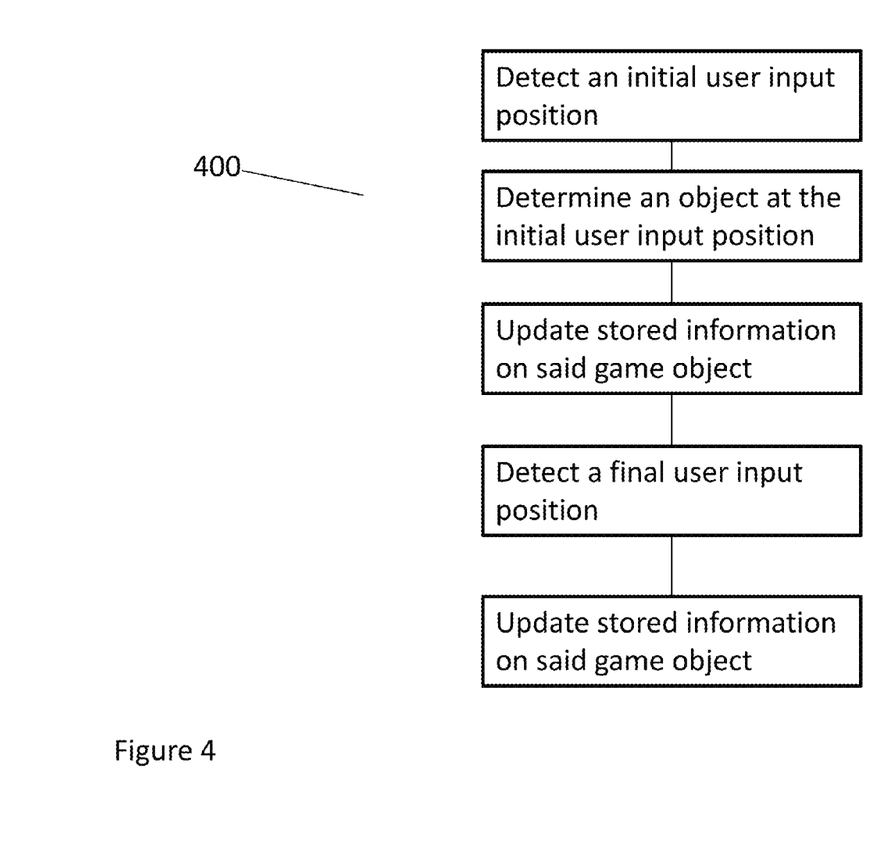
FIG. 4 is a flowchart illustrating an algorithm according to an embodiment.

FIG. 4 shows a flow diagram 400 of an algorithm in which an initial user input position is detected. The algorithm determines an object which is displayed at the initial user input position in dependence of the game object information stored in the at least one memory and user input. For a touchscreen display, the initial user input position may be the point at which a user first positions a finger or input device and the object which is displayed at the initial user position may be the object which is displayed under the user's finger or input device.

The determined object is then stored in the at least one memory. The algorithm determines a final user input position and gameboard information in dependence of user input via the user interface. For a touchscreen device, the final user input position may be the point from which the user removes his finger or input device. When the algorithm has detected the final user position, the determined object information is no longer stored in the memory.

Figure 5:
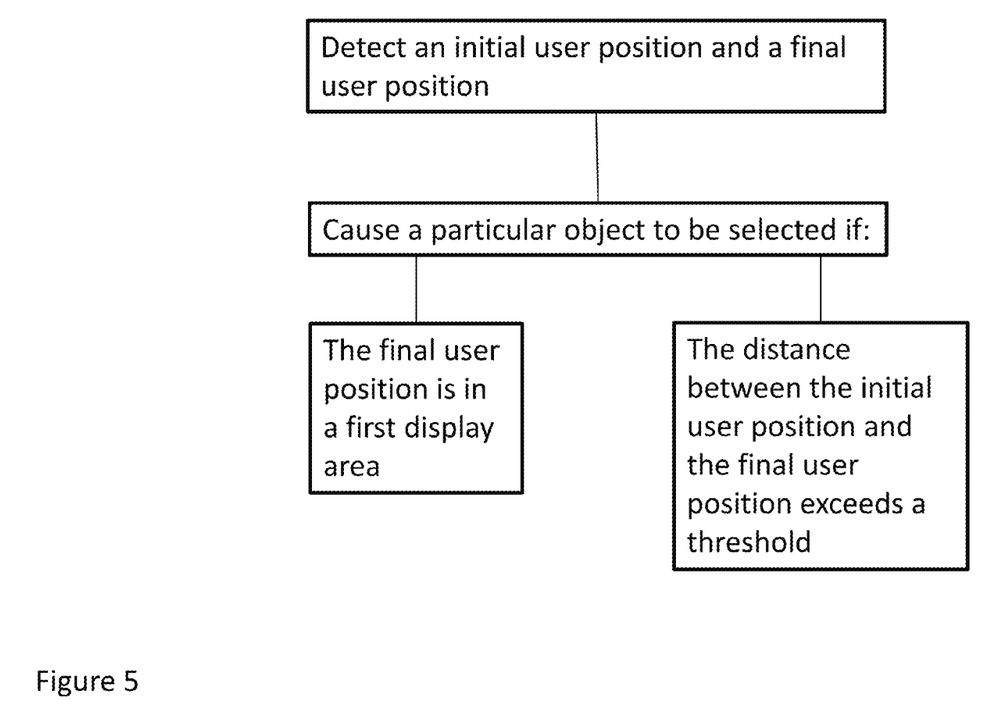
FIG. 5 is a flowchart illustrating an algorithm according to an embodiment.

FIG. 5 shows a flow chart of an algorithm which may be used to detect movement of a user input. The algorithm detects an initial and final user position. The initial and final user positions may be determined as the initial and final user positions described above in relation to FIG. 4. The algorithm may cause a particular object to be selected if the final user position is in a first display area, or if the detected distance between the initial user position and the final user position exceeds a threshold.

Figure 6:
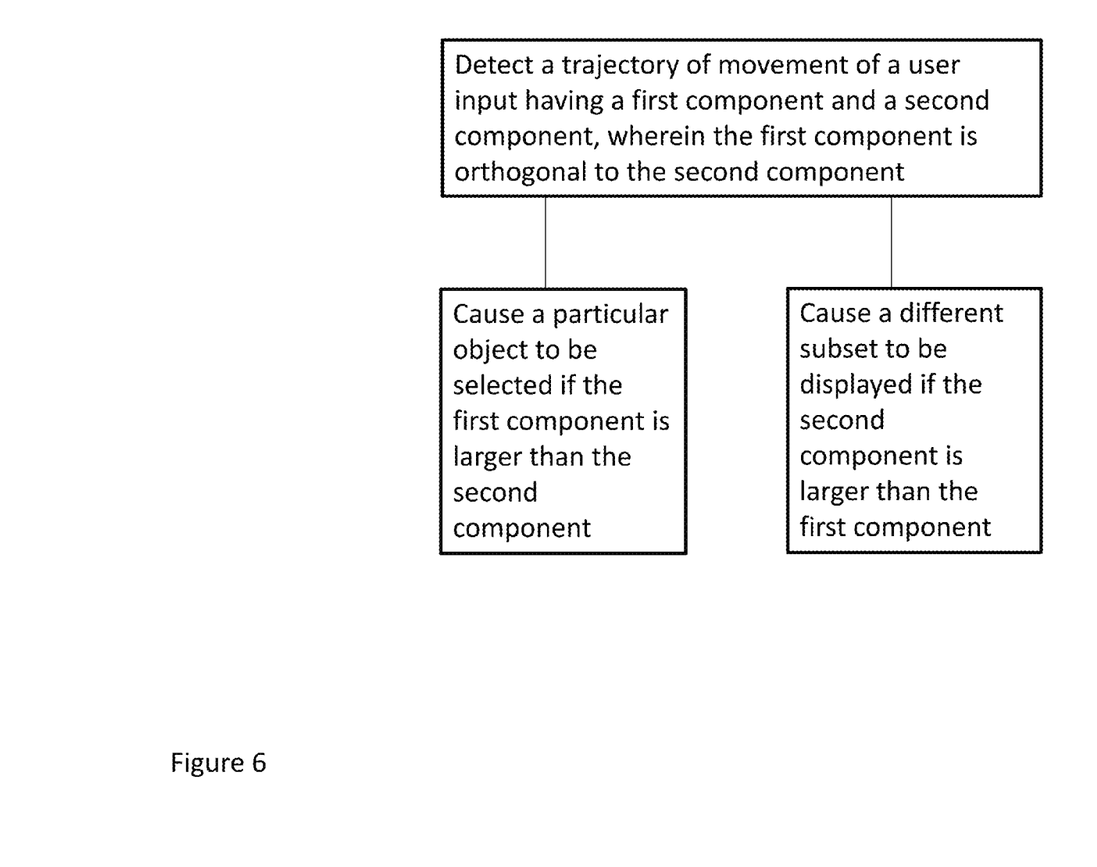
FIG. 6 is a flowchart illustrating another algorithm according to an embodiment.

FIG. 6 shows a flow chart of an algorithm which in determining if a particular object is selected or if a different subset of objects is to be displayed. The algorithm detects a trajectory of movement in dependence of a user input. The trajectory has a first component having a first direction and a second component having a second direction, wherein the first direction is orthogonal to the second direction. The algorithm may cause a particular object to be selected if the first component is larger than the second component and may cause a different subset of objects to be displayed if the second component is larger than the first component. The algorithm may cause the particular object to be selected if the first component extends a distance from the initial input position which exceeds a threshold. The particular object to be selected may be the determined object which is stored in a memory 120.

The algorithm may continue to cause different subsets to be displayed until a final user input position is detected. The speed at which the different subsets are caused to be displayed may depend on the acceleration of the user input movement and/or the frequency of multiple user inputs.

An algorithm may control game object characteristic information such that a game object may be displayed with a first size. The algorithm may control the size of the game object in dependence on game object position information stored in the at least one memory 120 and may cause the display to be updated in dependence of the position and trajectory of movement.

The objects, when selected, may provide a function within a game application.

This method allows a subset of a set of game objects to be displayed, and an algorithm for distinguishing between a user input for scrolling through game objects and selecting game objects. Thus it is straightforward, particularly on a small touchscreen, where space it is at a premium and it is not easy for a user to define fine input movements, for a user to review a set of game objects and select a game object for activation.

All of the algorithms of FIGS. 3 to 6 may be carried out by a processor 115 of a device in communication with the device and at least one memory 120.

Figure 7:
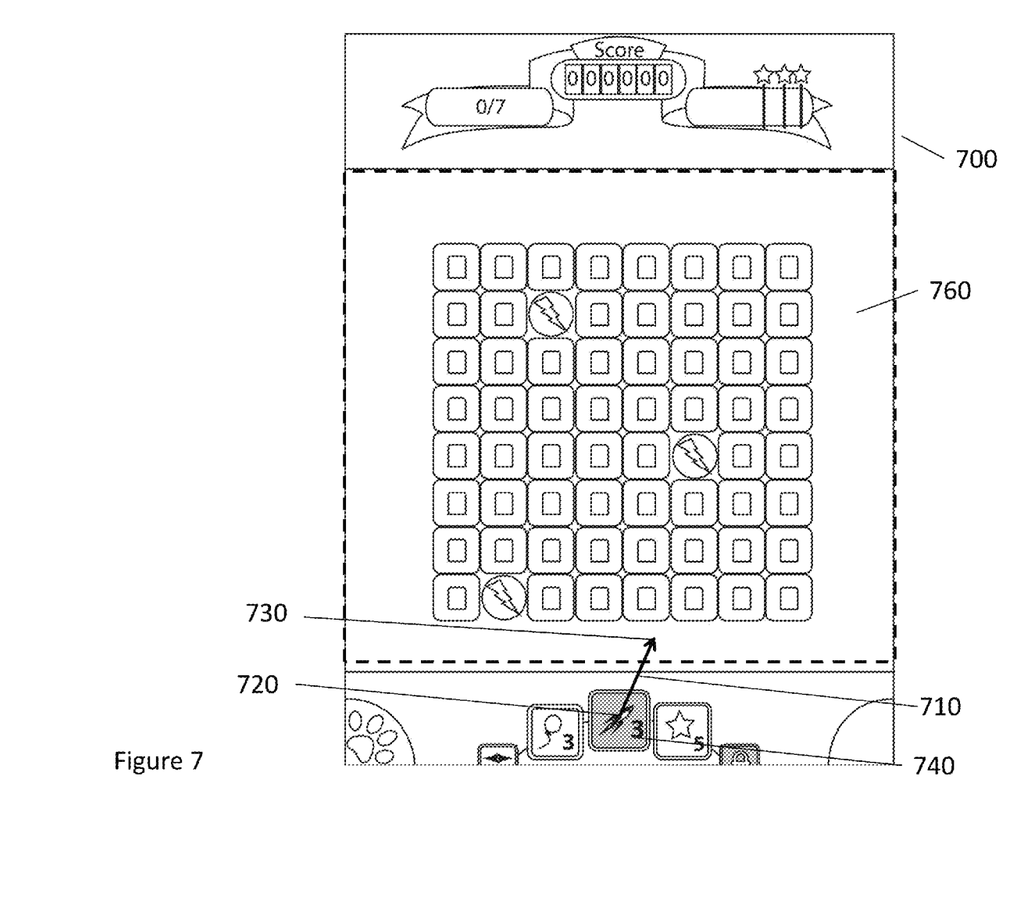
FIG. 7 illustrates a game board with an example user input.

FIGS. 7 to 10 show screen shots of an example computer implemented game. When playing a level, the player has ways of interacting with the game. One way of interaction is through the usage of boosters to enhance the gameplay while playing a level. In one implementation, this is done by using a fictitious wheel representing the available boosters. The user is only presented with the upper half of the wheel, and the wheel is in some implementations constructed as a ring, and the size of the ring is dependent on the amount of boosters available in the game as well as which ones are unlocked. It is also possible for the 'wheel' to be constructed as an endless line, presenting a repeating series of the same boosters. One implementation of the booster wheel is shown in FIG. 7.

The screenshots are of "Pet Rescue saga" by King.com, but those skilled in the art will recognise that other games and game mechanics, such as so-called "match-3" or "bubble shooters" or "pinball" type games may equally avail themselves to the embodiments herein described.

As can be seen in FIG. 7, a set of objects 710 are shown on a portion of a display area in object positions arranged in an annular configuration or wheel. In this example, the objects may be referred to as game objects. The set of objects is a subset of a larger plurality of objects. At least one of the objects is displayed with a first display characteristic. The associated display characteristics of the objects comprises at least a size, in addition to colour, transparency factors and other attributes which may indicate whether the first object is selectable. In the example shown in FIG. 7, the objects are game objects. The game objects may be a graphic depiction of game objects or elements known as "boosters".

An example user input movement 710 is depicted in FIG. 7 with an initial position 720 and a final position 730. The user input movement has a first component and a second component. The first and second components are orthogonal. In the example arrangement shown in FIG. 7, the first component is normal to the tangent of the curve of the wheel and the second component is tangential to the curve of the wheel.

In FIG. 7, the first component is larger than the second component, and so the algorithm will cause a particular object to be selected. An algorithm determines an object at the initial user position. In this example, the object is the graphical depiction of a rocket. The application may then cause the object to be stored in a memory 120 until the final user position is detected. The particular object to be selected may be the first object. In the example application shown in FIG. 7, the final user input position 730 is in a first display area 760 which comprises a gameboard. The algorithm, on detecting the final user position 730 in the first display area 760, may cause the particular object 740 to be selected. Alternatively or in addition, an algorithm may detect a distance 710 between the initial user input position and the final user input position and may cause a particular object to be selected if the distance exceeds a threshold. Alternatively, if the determined distance from the initial user position exceeds a threshold before a final user position is determined, the algorithm may determine that a particular game object is to be selected.

In FIG. 7, the first object has a first display characteristic which may comprise a first display size. The objects adjacent the first object in the subset may comprise a second display size. The objects displayed at either end of the subset may have a third display characteristic which may comprise a third display size. As shown in FIG. 7, the objects at either end of the subset may be caused to be partially visually represented.

Figure 8:
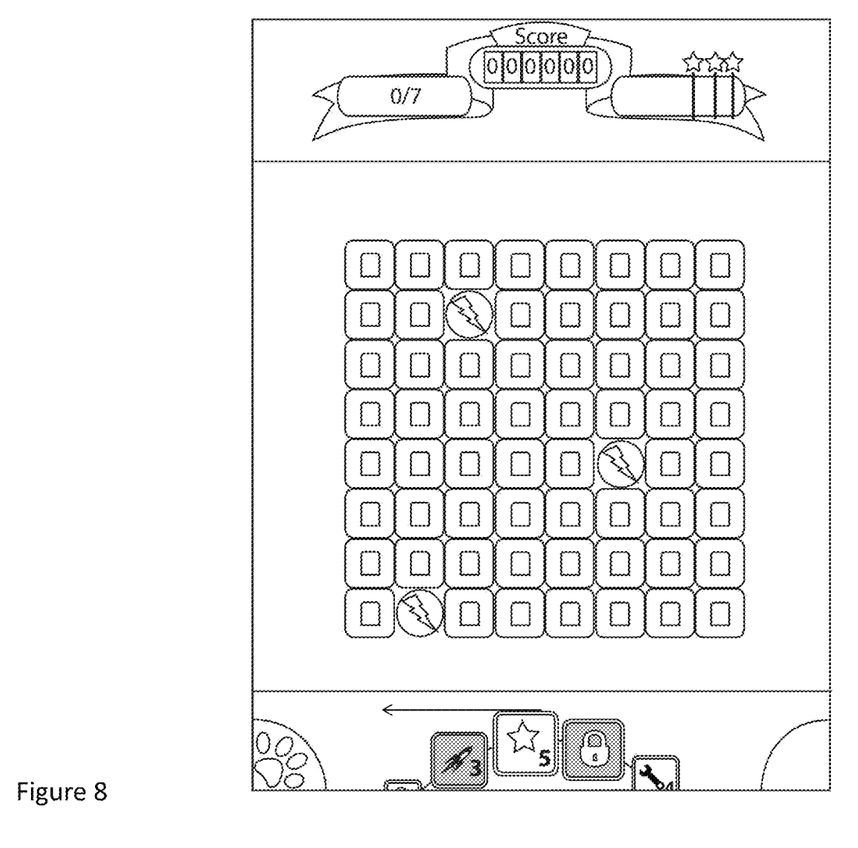
FIG. 8 illustrates the game board with an alternative user input.

FIG. 8 shows an alternative user input overlaid on a screen shot of the example application of FIG. 7. In this example, the second component is larger than the first component and so an algorithm causes a different subset of objects are caused to be displayed in dependence on the detected input. The objects may be caused to be displayed having the display characteristics as described above.

Figure 9:
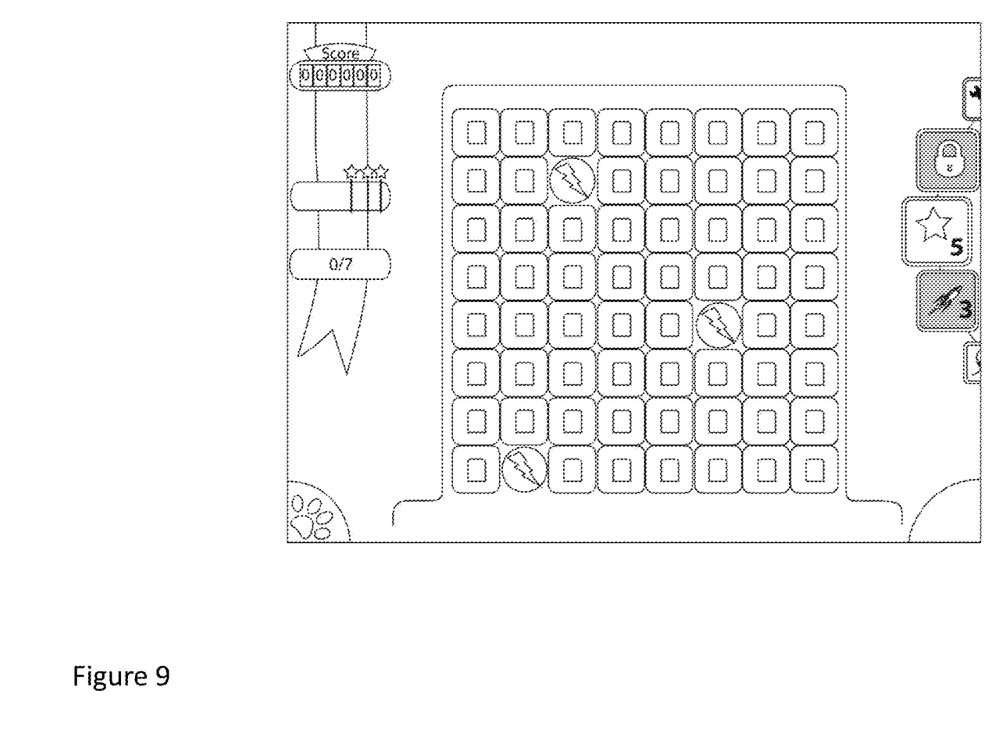
FIG. 9 illustrates an alternative game board.

The arrangement of objects may have a fixed position relative to the display screen. They may be displayed across the bottom of a portrait screen as shown in FIG. 7, or at the sides of a landscape screen as shown in FIG. 9. Although these combinations of displays have been shown here, any other suitable display configurations may also be used.

Figure 10:
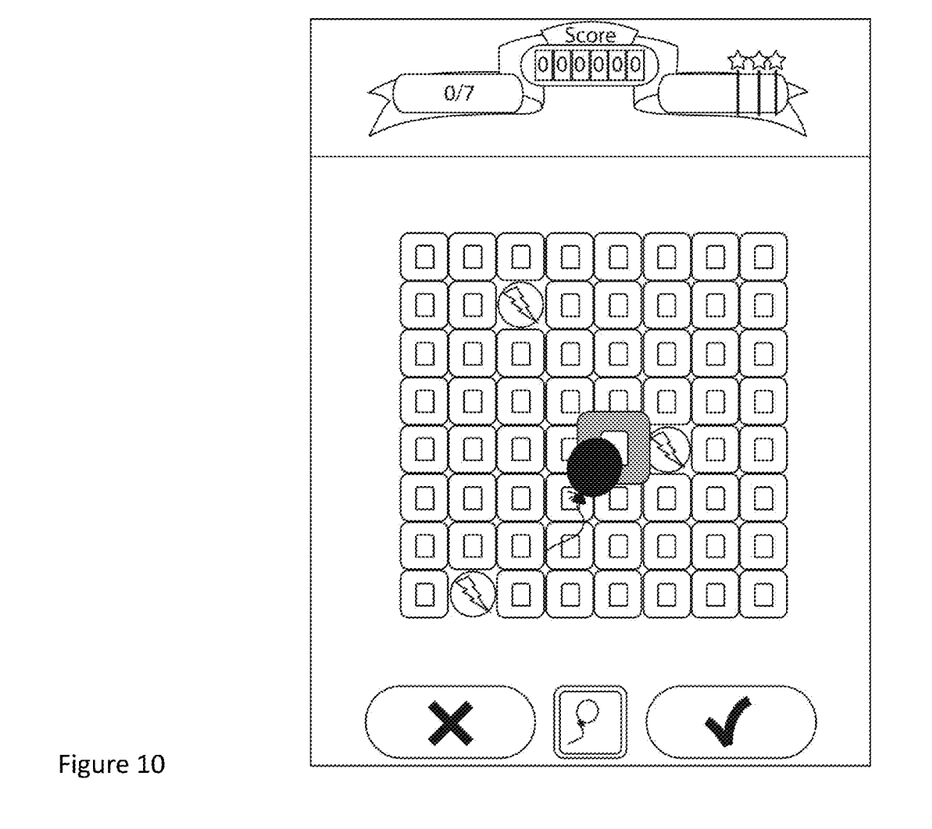
FIG. 10 illustrates a game board displaying a confirmation message

An algorithm may cause a message to be displayed to a user requesting confirmation that a particular object is to be selected. FIG. 10 shows an example of such a confirmation request in an example application.

Mobile Device Game Interface

A mobile device such as a smartphone has a memory, CPU and graphics rendering components that can implement the methods and systems described in this document.

Programming for mobile device pose certain constraints on what is possible to implement but from a processing power perspective where the mobile device typically do not have as much processing power as for instance a laptop computer or another physically larger computing device. A mobile device may also have other physical constraints such as the screen size and resolution. The developer typically have to design a user interface that is easy to navigate and to interact with one or several fingers if it is a touch screen device but the screen real estate still has to be used in a way so that the main information is presented to the user.

The ideas herein present ways to overcome these constraints when designing user interfaces for mobile devices. They will be exemplified as implemented in a mobile casual game that can be connected to a social network and other players and the user of the mobile device can also buy items in the game—either through an application store provider such as the Apple app store or for instance through a social network platform such as Facebook. It is also suggested that there can be buying options implemented in the gaming app itself.

Typical mobile devices can be displayed in landscape and portrait mode. There are different ways to implement the items on the screen, and where they are to be placed on the layout. One way to do this is to implement them in relation to each other or the physical borders of the screen. This way of implementing the elements on the screen enables different screen sizes without there having to be a specific layout and rendering instruction for each screen size, resolution and portrait/landscape. The method can slo use different size of the elements depending on the screen size and resolution or they can be in a fixed absolute size irrespective of the screen size but that they will be more or less spread out on the screen.

General Mobile Development Considerations and Constraints

This section contains a set of considerations that all developers face when developing for mobile devices.

Considerations—Memory

Memory is a very precious commodity on mobile devices. Make an effort to minimize the memory use as much as possible.

If there are several ways to solve a problem, choose the one with lowest memory use and processing overhead (at the expense of image quality).

Considerations—Graphics

Be aware that the size of some resources on disk may not correspond to the size that resource occupies in memory. PNG files may be highly compressed, but regardless of the file size will expand to a constant four bytes per pixel in device memory. For example, an image that is 512× 512 pixels and all white will become around 2 kB on disk, but still consume 512×512×4=1 MB space in device memory.

Contrary to PNG files, ETC and PVR compressed files always have a constant file size and memory consumption. In these cases, the file size actually roughly corresponds to the memory used on device.

Only use PNG's when absolutely necessary. The difference in memory usage is *immense*. For example, compared to a PVR 2 bpp compressed image, a PNG uses up 16× more memory (2 bpp vs 32 bpp), meaning that if the PVR compressed image is sufficient, you can have 16 times more content, or have your assets in 16 times higher resolution.

On Android, prefer ETC packed textures over PNGs. If you need alpha, consider splitting RGB and alpha in two ETC textures.

On iOS, prefer PVR 2 bpp, then PVR 4 bpp, and lastly PNGs.

If you have an image with alpha that has a shape which wastes a lot of area (i.e. a lot of the pixels are transparent), consider creating tight fitting mesh to render it it rather than specifying it as a sprite (which then becomes a simple quad). Spending a few extra verts can save fillrate, which helps to keep the framerate up.

In some implementations, avoid overdraw. In other words, avoid having several layers of graphics, causing pixels to be re-drawn several times. The optimal number of times a pixel should be drawn each frame is one, This may be hard to achieve, but designers should always keep this in mind when designing UI elements, so that they keep overlap to a minimum.

Considerations—Sound

Compress the sounds. Then compress it some more, for example, all the way down to or below 22 khz mono and using the lowest bitrate possible.

Constraints

Assume that the upper limit for the amount of data that can be held in memory at any given time is less than 20 MB.

All textures must be power-of-two

All textures must be smaller or equal to 2048×2048 pixels

Use the lowest possible size

Use the lowest possible number of bits per pixel (PVR(2 bpp)<PVR(4 bpp)/ETC<PNG(32 bpp))

User Interface

When playing a level, the player has ways of interacting with the game. One way of interaction is through the usage of boosters to enhance the gameplay while playing a level. In one implementation, this is done by using a fictitious wheel representing the available boosters. The user is only presented with the upper half of the wheel, and the wheel is in some implementations constructed as a ring, and the size of the ring is dependent on the amount of boosters available in the game as well as which ones are unlocked. It is also possible for the 'wheel' to be constructed as an endless line, presenting a repeating series of the same boosters. One implementation of the booster wheel is shown in FIG. 7.

The wheel typically has a fixed position, but the wheel itself is a movable object. The wheel can be operated by swiping, making it move either clockwise or counter-clockwise. In some implementations, the navigation between different boosters can be done through either soft or hard buttons, where one click on a button corresponds to scrolling to the next or previous booster in the list. The player is normally presented with one relatively large icon representing a booster in the top middle of the wheel, and one smaller icon on each side, each representing another booster. To the sides of the smaller icons are parts of icons that are about to come into view as the player interacts with the wheel. This is represented in FIG. 8 which shows a booster wheel that is rotating, which can be seen by the middle booster not being in the middle of the screen. The boosters can be activated by clicking on the icons representing them.

When scrolling the wheel to one side, the smaller icon on one side will rotate into the centre and become a larger icon, the smaller icon on the other side will rotate out of the user's view and the large icon will rotate into the spot of one of the smaller icons and decrease in size. In addition to the three aforementioned icons, there are also parts of icons showing to the left and right of the smaller icons, which represent boosters that are next in line on the wheel.

It is possible for the player to purchase new boosters in-game. In some implementations, this can only be done for boosters the player has already unlocked but does not have any copies of. In this case, when the player selects such a booster a choice is given to purchase copies of the booster. In other implementations, the player is given the option to buy boosters whenever a booster is selected, even when the player already has multiple copies of boosters already available. How many copies the player has available of a booster is indicated by a number shown adjacent to the booster.

Some boosters can be locked until a certain stage of the game has been reached. When accessing boosters, locked boosters are represented by a symbol indicating inaccessibility, such as a padlock. In some implementations, these boosters can be unlocked by a purchase. This purchase can for instance be accessed by selecting the locked booster on the wheel, then giving further input after an option to purchase has been presented to the user. Unlocked boosters are placed on the top of the wheel and locked boosters placed on the bottom, relative to the starting position of the wheel. Typically, boosters are positioned on the wheel in the order they were unlocked in the game.

In a typical implementation, boosters have a fixed position on the wheel, which can vary depending on the levels in the game. Boosters are usable in certain game modes, and only boosters that are usable on a level will be shown on the wheel. The fictitious wheel does not have a set amount of slots for boosters, it can be adjusted as more boosters are added or unlocked.

The positioning of the booster wheel can vary depending on the capabilities of the monitor of the device that the game is being played on. In some implementations it is placed in the bottom corner of the screen, but it can also be placed along other sides. On mobile devices that have different view modes, such as landscape and portrait modes, the positioning of the wheel can change when the user changes viewing mode. One example is a booster wheel placed at the bottom of the screen in portrait mode, and when the user changes to landscape mode, the booster wheel changes position to the right side of the screen. In some implementations, it is possible for the player to choose whether or not the booster wheel should be visible.

Another part of the user interface in the game is controls, such as audio and video controls, as well other options. In a typical implementation, controls and options are not shown at all times, but are accessible through a soft button. This button can be placed in for instance the bottom left corner of the screen, and when clicked more options and controls will be shown. One example of an implementation is a button with a paw symbol on it, that when clicked will expand four new buttons; sound controls, music controls, help and options. Further input from the user, such as a click, will then be used to navigate the controls and options. In other implementations, all available controls and options can be shown at all times. The reasoning behind the interface of the controls is a layered one, where each level gives the user more options to choose from, and a typical implementations has three layers of controls and options.

Another aspect of the user interface on mobile devices is that some game levels are too large to be displayed at one time on the screen. This can be solved by the level being scrollable, so that the user can select which portion of the level to display. The indication of a level being scrollable can be that an outline surrounding the blocks continues downward. In some implementations, the size of the elements in the game can be adjusted in order to make a level fill the whole screen area.

In one implementation, the boosters available on the booster wheel are the following:
Blockbuster—Allows the player to remove one block on the playing field
Column blaster—Removes one column of blocks
Colour pop—Removes all blocks of one colour
Line blaster—Removes all blocks in one row
Mesh Masher—Usable in levels containing cages, this booster removes all cages and makes caged blocks into regular blocks
Master Key—This booster is only usable on levels involving locked stone blocks, and will unlock and remove the stone blocks
+5 Moves—Gives the user five more moves to finish the level In some implementations, the selection of boosters is not represented on a fictitious wheel. It can be done as a series of booster icons shown on a line, and the user can navigate the line by either swiping or pressing soft buttons located at the ends of the line.

Another aspect of the interface in a mobile version is that certain boosters require activation through multiple steps. One example of this is a booster that requires the player to aim, such as one removing all the blocks on a particular colour. The player starts by selecting the booster from the booster wheel, then chooses a colour by clicking a block that corresponds with the colour the player wishes to remove, and after that the selection must be either confirmed or aborted. The choice of confirming or aborting the activation of a booster is shown in FIG. 10.

A way of having a game interface adapted for mobile devices, comprising:
expandable controls structured in multiple layers, wherein each layer provides additional functionality;
a wheel in the form of a fictitious ring used to show available items; and the option for a player to either confirm or abort the use of a booster after it has been selected Any combination of the ideas above where the amount of available boosters are indicated by a number adjacent to them.

Any combination of the ideas above where only parts of a large level is shown, and the user can navigate the level by scrolling.

Any combination of the ideas above where the wheel is operated by swiping.

Any combination of the ideas above where the wheel is operated by interactions with soft buttons.

Any combination of the ideas above where the interface changes when the user switches from portrait to landscape mode.

A person skilled in the art will realise that the different approaches to implementing the methods and device considerations herein are not exhaustive, and that which is described comprises certain embodiments. It is possible to implement the above in a number of variations without departing from the spirit or scope of the invention.

The invention claimed is:

1. A computer implemented method of controlling a user interface and displaying a game board arrangement, said user interface comprising a touch screen, the method comprising the following implemented by at least one processor in communication with said interface and at least one memory:
   displaying, on a display, said game board arrangement in a first display area and displaying in a second different area a subset of a set of game objects, each game object having one or more characteristics, information on said game board arrangement, said subset of game objects and said game objects being stored in said at least one memory;
   determining, using a controller, a position and trajectory of movement in dependence on user input received via said user interface;
   executing, on said controller, an algorithm for determining if a particular game object displayed in said second area is to be selected or if a different subset of game objects is to be displayed in said second area, in dependence on the position and trajectory of movement and the stored information on said subset of game objects, wherein a first position and trajectory of movement allows scrolling through said set of game objects and a second different position and trajectory of movement causes said particular game object to be selected and interact with said game board arrangement;
   updating said subset of game objects and information such that the particular game object is selected or a different subset of game objects is displayed; and
   displaying said updated subset of objects on said display.

2. A method according to claim 1, comprising determining an initial user input position and a final user input position.

3. A method according to claim 2, comprising causing a particular object to be selected if the distance between the initial user input position and the final user position exceeds a threshold.

4. A method according to claim 1, comprising determining a game object at the initial user input initiation position.

5. A method according to claim 4, comprising storing the determined object in at least one memory until detection of the final user input position.

6. A method according to claim 4, wherein the particular object to be selected is the determined object.

7. A method according to claim 1, comprising displaying a first gameboard arrangement in a first display area.

8. A method according to claim 7, comprising causing a particular object to be selected if the final user input position is in the first display area.

9. A method according to claim 1, comprising determining a trajectory of movement having a first component in a first direction and a second component in a second direction, wherein the first direction is orthogonal to the second direction.

10. A method according to claim 1, comprising causing a particular object to be selected if the first component is larger than the second component.

11. A method according to claim 10, comprising causing a particular object to be selected if the trajectory extends a distance in the first direction which exceeds a threshold.

12. A method according to claim 10, comprising, causing a different subset to be displayed if the second component is larger than the first component.

13. A method according to claim 1, comprising causing a plurality of different subsets to be displayed until a final user input position is detected.

14. A method according to claim 13, comprising determining acceleration in dependence of a user input and causing the plurality of different subsets to be displayed with a speed dependent on the acceleration.

15. A method according to claim 13, comprising determining frequency of a plurality of user inputs and causing a plurality of different subsets to be displayed with a speed dependent on the frequency.

16. A method according to claim 1, comprising causing the subset of objects to be displayed in an annular or linear arrangement.

17. A method according to claim 1, comprising causing at least one object to be displayed with a first display characteristic.

18. A method according to claim 17, comprising causing a different object to be displayed with the first display characteristic if a different subset is to be displayed.

19. A method according to claim 1, comprising controlling the size of a game object dependent on the position of the game object.

20. A method according to claim 1, wherein the game object to be selected provides a function in a game.

21. A device having:
   a user interface configured to display a game board having a plurality of game objects, at least one memory storing each game object having one or more characteristics, said user interface comprising a touch screen said user interface being configured to receive user input, and at least one processor in connection or communication with at least one memory configured to:
   display, on a display, said game board arrangement in a first display area and displaying in a second different area a subset of a set of game objects, each game object having one or more characteristics, information on said game board arrangement, said subset of game objects and said game objects being stored in said at least one memory;
   determine, using a controller, a position and trajectory of movement in dependence on user input received via said user interface;
   execute, on said controller, an algorithm for determining if a particular game object displayed in said second area is to be selected or if a different subset of game objects is to be displayed in said second area, in dependence on the position and trajectory of movement and the stored information on said subset of game objects, wherein a first position and trajectory of movement allows scrolling through said set of game objects and a second different position and trajectory of movement causes said particular game object to be selected and interact with said game board arrangement;

update said subset of game objects and information such that the particular game object is selected or a different subset of game objects is displayed; and display said updated subset of objects on said display.

22. A non-transitory computer readable storage device which stores program code instructions that, when executed by at least one processor in communication with a user interface and at least one memory, causes the at least one processor to:

display, on a display, said game board arrangement in a first display area and displaying in a second different area a subset of a set of game objects, each game object having one or more characteristics, information on said game board arrangement, said subset of game objects and said game objects being stored in said at least one memory;

determine, using a controller, a position and trajectory of movement in dependence on user input received via said user interface;

execute, on said controller an algorithm for determining if a particular game object displayed in said second area is to be selected or if a different subset of game objects is to be displayed in said second area, in dependence on the position and trajectory of movement and the stored information on said subset of game objects, wherein a first position and trajectory of movement allows scrolling through said set of game objects and a second different position and trajectory of movement causes said particular game object to be selected and interact with said game board arrangement;

update said subset of game objects and information such that the particular game object is selected or a different subset of game objects is displayed; and display said updated subset of objects on said display.

* * * * *